(12) United States Patent
Tenhunen et al.

(10) Patent No.: US 9,309,092 B2
(45) Date of Patent: Apr. 12, 2016

(54) FIXING ARRANGEMENT FOR A HOISTING MACHINE, AND ELEVATOR ASSEMBLY

(71) Applicants: Asmo Tenhunen, Hyvinkää (FI); Petri Alkula, Hämeenlinna (FI); Jussi Huppunen, Lappeenranta (FI); Mika Virnes, Hyvinkää (FI); Gabriela Simbierowicz, Kerava (FI)

(72) Inventors: Asmo Tenhunen, Hyvinkää (FI); Petri Alkula, Hämeenlinna (FI); Jussi Huppunen, Lappeenranta (FI); Mika Virnes, Hyvinkää (FI); Gabriela Simbierowicz, Kerava (FI)

(73) Assignee: KONE CORPORATION, Helsinki (FI)

( * ) Notice: Subject to any disclaimer, the term of this patent is extended or adjusted under 35 U.S.C. 154(b) by 522 days.

(21) Appl. No.: 13/685,242

(22) Filed: Nov. 26, 2012

(65) Prior Publication Data
US 2013/0081904 A1    Apr. 4, 2013

Related U.S. Application Data

(63) Continuation of application No. PCT/FI2011/050549, filed on Jun. 10, 2011.

(30) Foreign Application Priority Data

Jun. 10, 2010   (FI) ..................................... 20105661

(51) Int. Cl.
*B66B 11/08*    (2006.01)
*H02K 1/16*    (2006.01)
(Continued)

(52) U.S. Cl.
CPC ......... *B66B 11/0045* (2013.01); *B66B 11/0438* (2013.01); *H02K 1/16* (2013.01); *B66B 11/008* (2013.01); *H02K 1/2793* (2013.01); *H02K 7/1008* (2013.01); *H02K 21/24* (2013.01)

(58) Field of Classification Search
CPC .............. B66B 11/0045; B66B 11/008; B66B 11/0085; B66B 7/024; B66B 11/0438; H02K 1/16; H02K 1/2793; H02K 3/48; H02K 7/1008; H02K 21/12; H02K 21/24
USPC .................. 187/254, 255, 266, 406, 408, 250; 310/156.38, 156.44, 156.45, 216.112
See application file for complete search history.

(56) References Cited

U.S. PATENT DOCUMENTS 5,490,578 A * 2/1996 Aulanko et al. .............. 187/254
5,899,301 A   5/1999 Aulanko et al.
(Continued)

FOREIGN PATENT DOCUMENTS

CN  1242336 A   1/2000
CN  1081162 C   3/2002
(Continued)

OTHER PUBLICATIONS

EPO, Machine Translation, WO 2008 041266 A1, Sep. 3, 2015, pp. 1-14.*

(Continued)

*Primary Examiner* — William A Rivera
*Assistant Examiner* — Stefan Kruer
(74) *Attorney, Agent, or Firm* — Harness, Dickey & Pierce, P.L.C.

(57) ABSTRACT

The invention relates to a fixing arrangement of a hoisting machine, in which arrangement the hoisting machine comprises a stationary structure as well as a rotating structure; which rotating structure comprises a traction sheave, which comprises a traction surface for exerting a force effect; and in which fixing arrangement the hoisting machine is fixed with fixing means to an elongated support structure such that the hoisting machine is fixed to the support structure from at least two points that are situated apart in the width direction (w) of the support structure for damping the vibration caused by the operation of the hoisting machine.

24 Claims, 5 Drawing Sheets

(51) Int. Cl.
*B66B 7/06* (2006.01)
*H02K 21/24* (2006.01)
*B66B 11/00* (2006.01)
*B66B 11/04* (2006.01)
H02K 7/10 (2006.01)
H02K 1/27 (2006.01)

(56) References Cited

U.S. PATENT DOCUMENTS

| | | | |
|---|---|---|---|
| 5,957,242 A * | 9/1999 | Suter et al. | 187/266 |
| 6,401,873 B1 * | 6/2002 | Mustalahti et al. | 187/292 |
| 6,628,031 B2 * | 9/2003 | Vollmer | H02K 1/2766 |
| | | | 310/156.38 |
| 6,848,543 B2 * | 2/2005 | Adifon et al. | 187/254 |
| 6,894,413 B2 * | 5/2005 | Nakano | F03D 9/002 |
| | | | 310/156.01 |
| 6,946,768 B2 * | 9/2005 | Kruse | H02K 3/28 |
| | | | 310/179 |
| 6,991,069 B1 * | 1/2006 | Ach | 187/406 |
| 7,000,736 B2 * | 2/2006 | Rice et al. | 187/408 |
| 2002/0108815 A1 * | 8/2002 | Mustalahti et al. | 187/254 |
| 2004/0104079 A1 * | 6/2004 | Fischer | 187/254 |
| 2004/0112681 A1 | 6/2004 | Kato et al. | |
| 2004/0119363 A1 * | 6/2004 | Tanaka | H02K 21/16 |
| | | | 310/214 |
| 2004/0188183 A1 | 9/2004 | Kato et al. | |
| 2005/0087398 A1 * | 4/2005 | Aulanko et al. | 187/254 |
| 2005/0126859 A1 * | 6/2005 | Aulanko et al. | 187/264 |
| 2005/0284705 A1 * | 12/2005 | Aulanko et al. | 187/266 |
| 2006/0231345 A1 * | 10/2006 | Mustalahti et al. | 187/266 |
| 2007/0252466 A1 * | 11/2007 | Clark | H02K 1/278 |
| | | | 310/156.45 |
| 2009/0251024 A1 | 10/2009 | Huppunen et al. | |

FOREIGN PATENT DOCUMENTS

| | | | |
|---|---|---|---|
| CN | 1191984 C | 3/2005 | |
| CN | 101511718 A | 8/2009 | |
| CN | 101569078 A | 10/2009 | |
| EP | 1302432 A1 * | 4/2003 | B66B 11/00 |
| EP | 1405812 A1 | 4/2004 | |
| EP | 2067734 A1 | 6/2009 | |
| JP | H11314870 A | 11/1999 | |
| WO | WO 0181227 A1 * | 11/2001 | B66B 11/00 |
| WO | WO 2008041266 A1 * | 4/2008 | B66B 11/04 |
| WO | WO-2008074910 A1 | 6/2008 | |

OTHER PUBLICATIONS

International Search Report PCT/ISA/210 for International Application No. PCT/FI2011/050549.
Finnish Search Report dated Mar. 2, 2011.
International Written Opinion dated Sep. 2, 2011 issued in corresponding International Application No. PCT/FI2011/050549.

* cited by examiner

FIXING ARRANGEMENT FOR A HOISTING MACHINE, AND ELEVATOR ASSEMBLY

CROSS REFERENCE TO RELATED APPLICATIONS

This is a continuation of PCT/FI2011/050549 filed Jun. 10, 2011, which is an International Application claiming priority to FI 20105661 filed on Jun. 10, 2010, the entire contents of each of which are hereby incorporated by reference.

FIELD OF THE INVENTION

The invention relates to fixing solutions and support solutions for a hoisting machine.

BACKGROUND OF THE INVENTION

It is a general aim to utilize built space as efficiently as possible. For example, owing to space requirements, one aim is to make the hoisting machines of elevators as compact as possible. In order to achieve this, hoisting machines are designed to be as flat as possible in their dimensions in the direction of the axis of rotation or as small as possible in their dimensions in the direction of the radius, in which case the hoisting machines fit better in connection with, for instance, the wall part of the elevator hoistway or into some other narrow/shallow space.

The rigidity of the hoisting machine might form a problem e.g. when minimizing the length in the direction of the axis of rotation of a hoisting machine implemented with an axial flux motor. For example, rigidity is required of the hoisting machine of an elevator as well as of the support structure of the hoisting machine, because the hoisting machine must support the elevator mechanics suspended in the elevator hoistway. Also the noise level of the hoisting machine might increase to be disturbing when the rigidity of the hoisting machine weakens.

SUMMARY OF THE INVENTION

The aim of the invention is to disclose a solution to the problem for increasing the rigidity of a hoisting machine fixed to a support structure in the elevator hoistway, more particularly when the size of the hoisting machine decreases. In connection with this, the invention also discloses a solution to the problem for maximizing the efficiency of utilization of the space of an elevator hoistway, taking into account the rigidity requirements for a hoisting machine and for a support structure of the hoisting machine.

In the fixing arrangement for a hoisting machine according to the invention the hoisting machine comprises a stationary structure as well as a rotating structure. The rotating structure comprises a traction sheave, which comprises a traction surface for exerting a force effect. In the fixing arrangement the hoisting machine is fixed with fixing means to an elongated support structure. The elongated support structure is preferably continuous in the vertical direction, e.g. a guide rail of the elevator car or of the counterweight. The hoisting machine is fixed from at least two points that are situated apart in the width direction of the support structure for damping the vibration caused by the operation of the hoisting machine. The aforementioned fixing points are preferably disposed in the top part of the hoisting machine and at essentially the same height as each other. The aforementioned fixing points are preferably situated at a distance from each other of at least the width of the support structure and on different sides of the support structure. The hoisting machine is connected from its fixing points to a fixing means/to fixing means with dampers that are preferably of elastomer. The fixing means is/are fixed rigidly to the support structure. Consequently, when the fixing points with their dampers are spread by at least the width of the support structure apart from each other, the hoisting machine is not easily able to bend around the longitudinal axis of the support structure. This makes it possible that the hoisting machine does not need to be as rigid as the type of prior-art hoisting machine that is fixed only at the point of the support structure in order to meet a certain bending criterion. Consequently, the rigidity needed can be achieved with a hoisting machine of a more lightweight structure than prior-art, or the rigidity of a hoisting machine can be improved compared to what it was before by using a fixing arrangement according to the invention.

The distance between the aforementioned fixing points is preferably greater than, or equal to, the diameter of the traction sheave. The solution effectively damps vibrations of the hoisting machine, more particularly bending vibrations that are caused by a force (in an emergency stop situation, et cetera) exerted on the traction sheave and that occur in relation to the longitudinal axis of the support structure, because the fixing points resist the vibration by exerting a force opposing the vibration, the lever arm of which force for the bending occurring in relation to the longitudinal axis of the support structure is, owing to the distance between the fixing points, at least as large as or larger than the lever arm of the force exerted on the traction sheave and producing the vibration. In this way the dimensioning of the fixing points in relation to the force exerted on the fixing points can be reduced, in which case the fixing points/dampers connected to the fixing points can, if necessary, be made structurally lighter than those according to prior art.

In a preferred embodiment of the invention the aforementioned fixing means is rigid and the fixing means continues essentially as an integral piece between the fixing points.

The hoisting machine is fixed at its bottom part to a support structure preferably from only one fixing point, which simplifies the fixing arrangement.

In a preferred embodiment of the invention the hoisting machine comprises a stiffener rib, which is fitted onto the opposite side of the traction sheave than the stationary structure of the hoisting machine, and fixed rigidly to the stationary structure of the hoisting machine such that the traction sheave is disposed in the space remaining between the stiffener rib and the stationary structure of the hoisting machine. The elongated support structure, which is essentially continuous in the vertical direction, passes by the stiffener rib in the immediate proximity of it. The stiffener rib is shaped to extend away from the traction sheave, extending at most 18 millimeters to beside the support structure. In this case the stiffener rib makes the hoisting machine even more rigid, in which case extra space does not need to be reserved for the hoisting machine in the direction of bending of the hoisting machine.

In one embodiment of the invention the hoisting machine comprises a disc brake; in this case a ring-shaped rim is preferably formed as an extension of the outermost rim of the rotating structure of the hoisting machine for the brake disc of the disc brake.

In one embodiment of the invention the hoisting machine comprises a drum brake; in this case the brake ring of the drum brake is preferably formed as an extension of the outermost rim of the rotating structure of the hoisting machine.

The ratio of the distance between the fixing points disposed in the top part of the hoisting machine to the diameter of the brake disc/brake ring is preferably greater than 0.5.

The elevator assembly according to the invention comprises an elevator car; which elevator car is suspended in the elevator hoistway with suspension means; and which elevator assembly comprises a hoisting machine for moving the elevator car along a guide rail fixed to a wall part of the elevator hoistway. The stationary structure of the hoisting machine comprises a stator and the rotating structure of the hoisting machine comprises both a rotor and a traction sheave. The traction sheave comprises a traction surface for receiving the aforementioned suspension means, and the suspension means are rotatably supported with the aforementioned traction surface. The stator, rotor and traction sheave are fitted concentrically onto the axis of rotation of the hoisting machine, and the hoisting machine is fitted into connection with the aforementioned guide rail fixed to a wall part of the elevator hoistway apart from the wall surface such that the suspension means arriving at the traction surface and/or leaving from the traction surface of the traction sheave travel closer to the wall part of the elevator hoistway than the rear part of the guide rail. The rotating structure of the hoisting machine is supported on the stationary structure of the hoisting machine via one or more bearings, and the stationary structure of the hoisting machine is further supported on the aforementioned guide rail fixed to a wall part of the elevator hoistway such that the guide rail bears the force exerted on the traction surface via the suspension means. The stator of the hoisting machine comprises a concentrated fractional-slot winding, the slot number q of which is smaller than 0.5. The distance of the rear surface of the aforementioned guide rail fixed to a wall part of the elevator hoistway from the aforementioned wall part of the elevator hoistway is selected to be:

a) at least 120 millimeters and at most 170 millimeters when the nominal load of the elevator car is at most 480 kg;

b) at least 128 millimeters and at most 170 millimeters when the nominal load of the elevator car is greater than 480 kg and smaller than, or equal to, 680 kg;

c) at least 150 millimeters and at most 195 millimeters when the nominal load of the elevator car is greater than 680 kg and smaller than 1155 kg.

The slot number q of the concentrated fractional-slot winding in the stator of the hoisting machine is most preferably 0.3. When the slot number of the elevator motor that functions as the power-producing part of the hoisting machine decreases, the number of stator slots in relation to the number of rotor poles also decreases. When the number of stator slots decreases, the space needed by the stator winding, and more particularly by the winding overhangs, also decreases. In this case the hoisting machine can be fixed to a guide rail of the elevator car in connection with a wall part of the elevator hoistway in a smaller space than prior art. For increasing the rigidity of the hoisting machine, the hoisting machine can be fixed using the fixing arrangement for a hoisting machine described in the preceding. A suspension ratio of 2:1, or even greater, can further be selected as the suspension ratio of the elevator assembly, and the force exerted, via the traction surface of the traction sheave, on the guide rail supporting the hoisting machine can therefore be reduced. When the distance of the guide rail supporting the hoisting machine is further selected, in the manner presented in the invention, as a function of the nominal load, i.e. of the maximum load during normal operation, of the elevator car, the space box of the elevator car in the elevator hoistway can be increased and therefore the usable cross-sectional area of the elevator hoistway can be utilized more efficiently than in prior art. The invention is applicable for use in elevator assemblies with counterweight; the space advantage to be achieved with the invention can, however, also be utilized by applying the invention to elevator assemblies without counterweight.

In a preferred embodiment of the invention the hoisting machine is disposed in the space remaining between the aforementioned guide rail and the wall part of the elevator hoistway. The axis of rotation of the hoisting machine is preferably disposed essentially orthogonally with respect to the wall part. The traction sheave, the rotor and the stator are preferably disposed consecutively in the direction of the axis of rotation of the hoisting machine. The elevator motor according to the invention is preferably an axial flux motor; in this case the air gap remaining between the rotor and the stator of the elevator motor is preferably in the direction of the axis of rotation of the hoisting machine.

In a preferred embodiment of the invention the rim part of the traction sheave and also the stator are disposed essentially face-to-face in the direction of the axis of rotation of the hoisting machine. This type of an arrangement stiffens more particularly a hoisting machine provided with an axial flux motor.

Preferably at least one rope pulley that moves along with the elevator car is fixed into connection with the elevator car, and the aforementioned rope pulley is suspended with the aforementioned suspension means for supporting the elevator car. The suspension ratio of the elevator assembly is in this case preferably 2:1 or even higher. The suspension means is preferably a hoisting rope. The diameter of a round hoisting rope is preferably smaller than, or equal to, 8 mm, most preferably 4 mm or even less.

The hoisting machine according to the invention is preferably a permanent-magnet motor. The rotor is in this case preferably magnetized by fixing permanent magnets into a ring-like rim onto the surface of the rotating structure of the hoisting machine.

In a preferred embodiment of the invention the hoisting machine is disposed in the top part of the elevator hoistway. In this case the elevator car can preferably be suspended in the elevator hoistway with the same suspension ropes or suspension belt running via the traction sheave of the hoisting machine as the suspension ropes or suspension belt with which the elevator car is driven.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
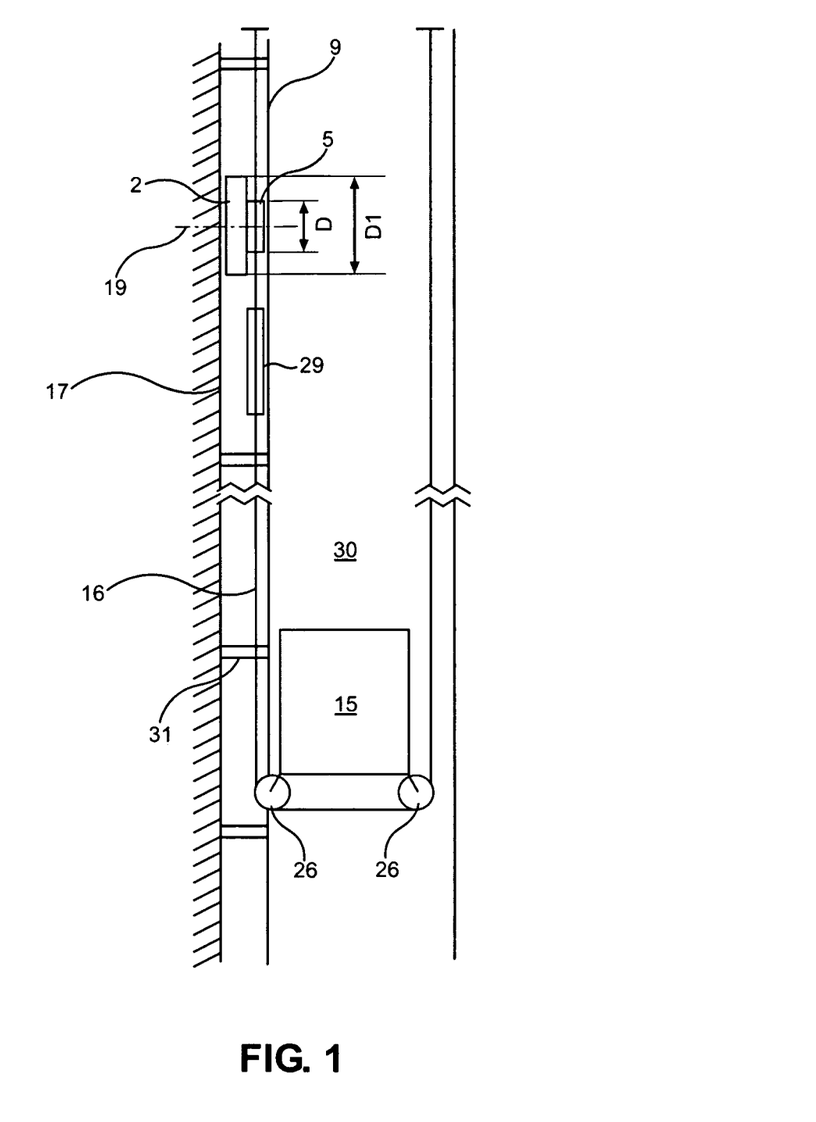
FIG. 1 presents an elevator assembly according to the invention, as a block diagram

FIG. 1 presents as a block diagram an elevator assembly, in which the elevator car 15 and the counterweight 29 are suspended in the elevator hoistway 30 with suspension ropes 16. The elevator car 15 is moved with the hoisting machine 2 of the elevator, said hoisting machine being disposed in the top part of the elevator hoistway 30, along a guide rail 9 fixed to a wall part 17 of the elevator hoistway by exerting a force effect on the elevator car with hoisting ropes 16 traveling via the traction sheave 5 of the hoisting machine 2 of the elevator. On the surface of the traction sheave 5 are rope grooves, in which the hoisting ropes move along with the rotational movement of the traction sheave such that the hoisting ropes are rotatably supported in the rope grooves. The power supply to the hoisting machine 2 of the elevator occurs with a frequency converter (not shown in figure) connected between an electricity network and the hoisting machine 1 of the elevator. The frequency converter and the hoisting machine 2 of the elevator are disposed in the elevator hoistway 30, in connection with a wall part of the elevator hoistway outside the path of movement of the elevator car 15. The hoisting machine 2 of the elevator is fixed to a guide rail 9 of the elevator car apart from the wall part 17 of the elevator hoistway with fixing means, such that the guide rail 9 bears the force exerted on the rope grooves of the traction sheave 5 via the hoisting ropes 16. The guide rail 9 is fixed to the wall part 17 of the elevator hoistway with guide rail fixings 31.

Figure 3A:
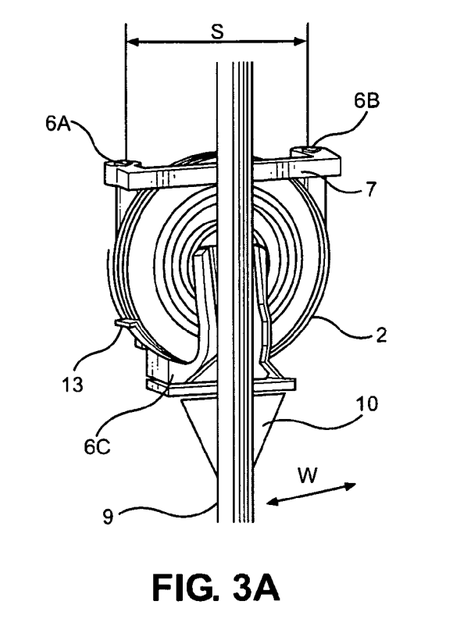
FIGS. 3a-3d present a fixing arrangement according to the invention for a hoisting machine
Figure 3B:
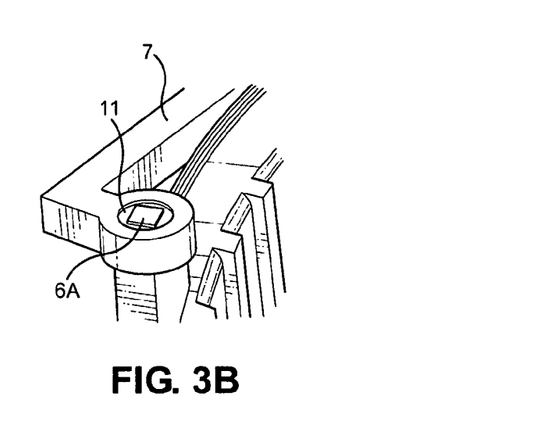
Figure 3C:
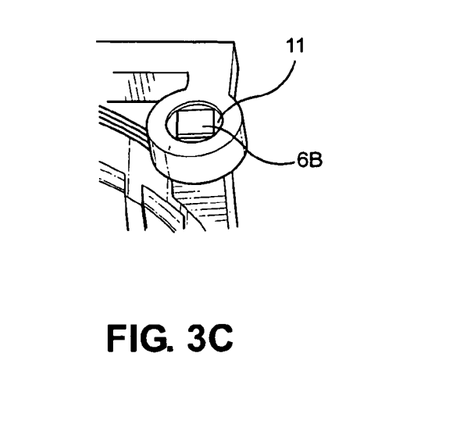
Figure 3D:
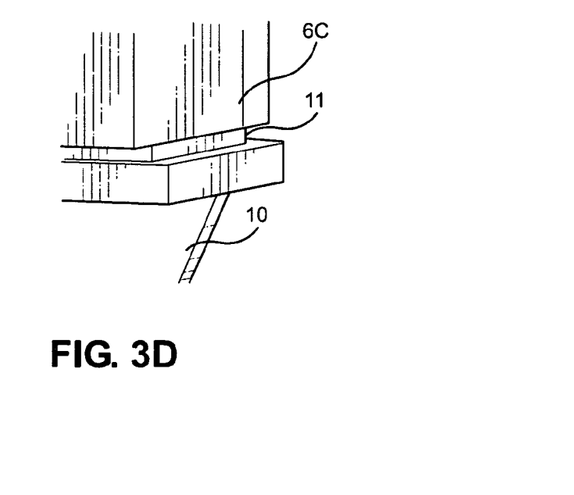

According to FIG. 1 the hoisting machine 2 of the elevator is disposed in the space between the aforementioned wall part 17 of the elevator hoistway and the guide rail 9 such that the axis of rotation 19 of the hoisting machine is situated essentially orthogonally with respect to the aforementioned wall part 17. As presented in FIG. 1, the hoisting ropes 16 arriving at the rope grooves of the traction sheave 5 of the hoisting machine 2 as well as the hoisting ropes 16 leaving from the rope grooves travel closer to the wall part 17 of the elevator hoistway than the rear part of the guide rail 9 of the elevator car. FIG. 3a presents in more detail the fixing arrangement 1 for a hoisting machine 2 used in the elevator assembly of FIG. 1. According to FIG. 3a the hoisting machine 2 is fixed at its top part to the guide rail 9 from two points 6A, 6B, which are at the same height and which are situated apart from each other in the width direction w of the guide rail 9 of the elevator car, with a rigid fixing means 7, which continues essentially as an integral piece between the fixing points 6A, 6B. For this purpose the fixing points 6A, 6B of the hoisting machine 2 comprise fixing pins/fixing bolts. The fixing means 7 is fixed rigidly to the guide rail e.g. with fixing pins, fixing bolts or fixing screws. The hoisting machine is fixed at its bottom part to a guide rail 9 from only one fixing point 6C with a rigid fixing means 10. FIGS. 3b, 3c and 3d present in more detail the fixing points 6A, 6B, 6C of a hoisting machine in a fixing arrangement according to FIG. 3a. The fixing pins of the fixing points 6A, 6B of the top part of the hoisting machine 2 as well as the fixing point 6C of the bottom part are connected to the rigid fixing means 7, 10 with an elastomer 11, which damps the vibration caused by the operation of the hoisting machine, e.g. from the effect of groove harmonics. The brake ring 13 of the drum brake is formed as an extension of the rotating structure of the hoisting machine 2. Two drum brakes (not in figure) movably supported on the stationary structure of the hoisting machine are the machinery brakes of the hoisting machine 2, the brake shoes of which drum brakes engage, pressed by a spring pack, against the brake ring 13 to brake the movement of the traction sheave 5 of the hoisting machine. For example, in connection with an emergency stop the brake shoes of the machinery brakes engage to brake a traction sheave that is moving rotationally; in this case, owing to the kinetic energy of the elevator car, an essentially large force braking the movement of the traction sheave is formed between the rotating structure and the stationary structure of the hoisting machine, which force tries to produce vibration of the hoisting machine. For damping the vibrations of the hoisting machine 2, the distance s between the fixing points 6A, 6B of the top part of the hoisting machine is selected to be equal to, or even greater than, the diameter D of the traction sheave 5. The distance s between the fixing points 6A, 6B could also be selected e.g. such that the ratio of the distance s to the diameter D1 of the brake ring is great, e.g. greater than 0.5. This type of fixing arrangement stiffens the structure of the hoisting machine 2, reducing the vibration of the hoisting machine.

Figure 4A:
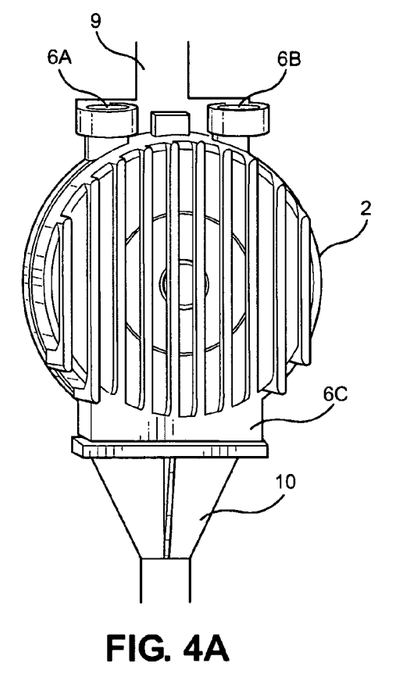
FIG. 4a presents a fixing arrangement according to the invention for a hoisting machine
Figure 4B:
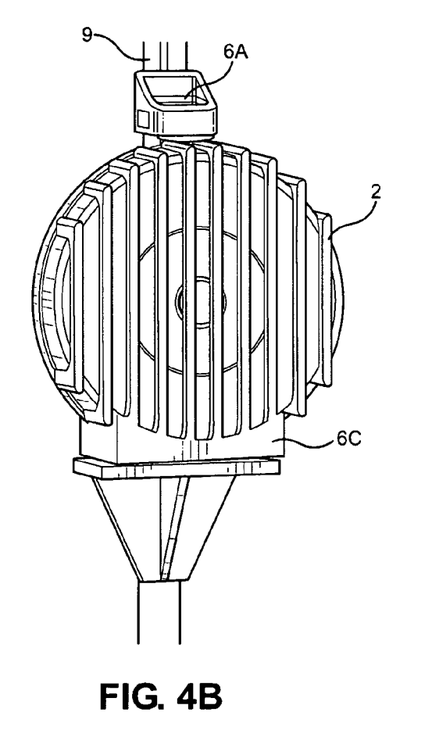
FIG. 4b presents a fixing arrangement according to prior art for a hoisting machine

FIG. 4a presents a second fixing arrangement for a hoisting machine according to the invention; in this, the fixing points 6A, 6B of the top part of the hoisting machine 2, with the dampers of said fixing points, are not spread in the width direction of the guide rail 9 by as great a distance from each other as in the fixing arrangement of FIG. 3a; the fixing points 6A, 6B with their dampers are, however, disposed at least the width of the guide rail 9 apart from each other. Also with this an improvement is achieved in the rigidity of the hoisting machine compared to the prior-art fixing arrangement of FIG. 4b, in which the hoisting machine is fixed at its top part from only one point 6A to the guide rail 9. This is because in the fixing arrangement according to the invention the hoisting machine is not able to bend around the longitudinal axis of the guide rail 9 in the same way as in the prior-art fixing arrangement according to FIG. 4b.

Figure 2:
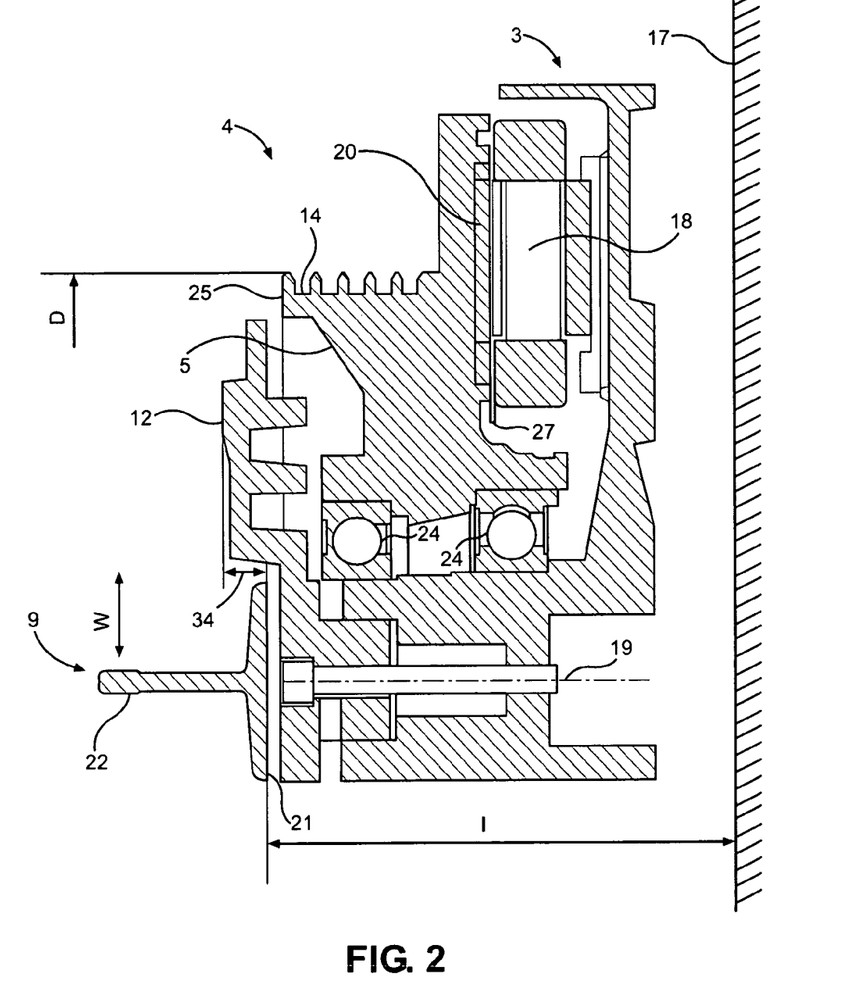
FIG. 2 presents a part of a hoisting machine according to the invention, as viewed from above in the elevator hoistway and sectioned open in the direction of the radius from the axis of rotation of the hoisting machine

A permanent-magnet synchronous motor functions as the power-producing part of the hoisting machine 2, the stator of which motor is disposed in a stationary structure of the hoisting machine and the rotor is disposed in a rotating structure of the hoisting machine. One possible structure of a hoisting machine e.g. applicable to the embodiment of FIG. 1 or of FIG. 3a is presented in more detail in FIG. 2, as viewed from above in the elevator hoistway and sectioned open in the direction of the radius from the axis of rotation 19 of the hoisting machine 2. The rotor 20 and the stator 18 of the hoisting machine are disposed on opposite sides of the air gap 27. The air gap is essentially in the direction of the axis of rotation 19 of the hoisting machine. The traction sheave 5 of the hoisting machine is integrated into the same piece as the rotor 20. The rim part 25 of the traction sheave 5 and also the stator 18 are disposed essentially face-to-face in the direction of the axis of rotation 19 of the hoisting machine, in which case the rim part 25 stiffens the rotating structure 4 of the hoisting machine more particularly for the effect of the force component in the direction of the air gap 27 between the rotor 20 and the stator 18. For stiffening the hoisting machine, the hoisting machine also comprises a stiffener rib 12, which is fitted onto the opposite side of the traction sheave 5 than the stationary structure 3 of the hoisting machine. The stiffener rib 12 is fixed rigidly to the stationary structure of the hoisting machine such that the traction sheave 5 is disposed in the space remaining between the stiffener rib 12 and the stationary structure 3 of the hoisting machine. The guide rail 9, to which the hoisting machine is fixed with fixing means (not in figure) passes by the stiffener rib 12 in the immediate proximity of it. The stiffener rib is shaped to extend away from the traction sheave 5, extending at most 18 millimeters to beside the guide rail 9, calculated starting from the rear part 21 of the guide rail. Consequently, the elevator car moving along the guide surface 22 of the guide rail, said elevator car being supported on the guide rail (not in figure) fixed in connection with the elevator car, can travel closer than prior art to the rear part 21 of the guide rail, which makes it possible for the dimension of the elevator car to be increased towards the wall part 17 of the elevator hoistway.

Figure 5A:
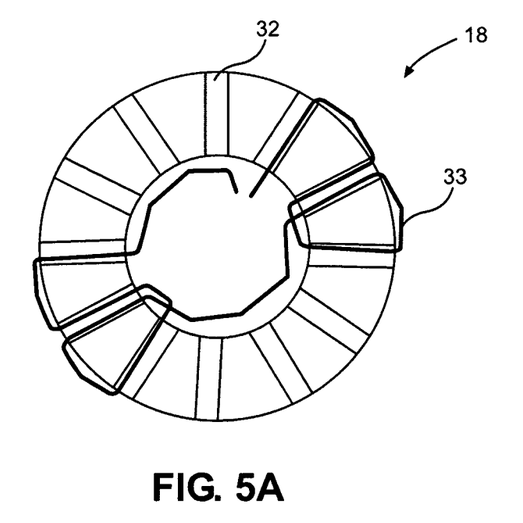
FIG. 5a illustrates a stator according to the invention of a hoisting machine as viewed from the direction of the axis of rotation
Figure 5B:
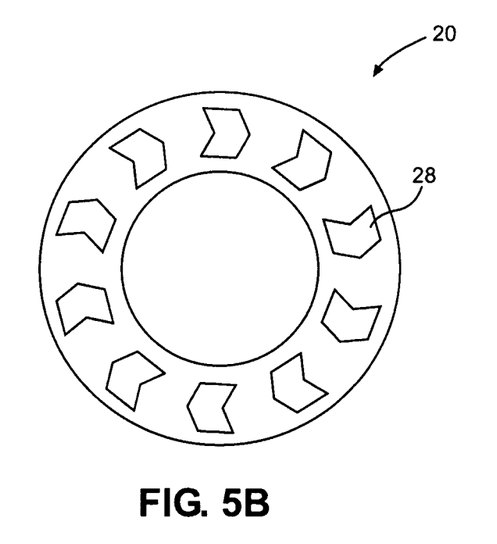
FIG. 5b illustrates a rotor according to the invention of a hoisting machine as viewed from the direction of the axis of rotation

One possible structure of the stator of a hoisting machine is illustrated in FIG. 5a and one possible structure of the rotor of a hoisting machine is illustrated in FIG. 5b. The rotor 20 is magnetized with permanent magnets, such that permanent magnets 28 are fixed into a ring-like rim onto the surface of the rotating structure 4 of the hoisting machine. The polarities of two consecutive permanent magnets are of opposite directions to each other; and each of the permanent magnets forms a magnetic pole of the rotor. The stator 18 comprises slots 32, into which a concentrated winding 33 is fitted, in which case the wire of the same phase winding passes in slots that are next to each other. By combining the stator 18 and the rotor 20 of FIGS. 5a, 5b, the slot number of the concentrated fractional-slot winding obtained is 0.4. In the most preferred embodiment of the invention the stator 18 of the hoisting machine, however, comprises a concentrated fractional-slot winding, the slot number q of which is 0.3. The term slot number refers to the number N1 of stator slots that are in a stator in relation to the number N2 of magnetic poles of the rotor per phase; therefore, in the case of a three-phase motor, the following equation is obtained for the slot number:

$$q = \frac{N1}{3*N2}$$

A slot number of 0.3 is preferably obtained by selecting 36 as the number of stator slots and 40 as the number of magnetic poles of the rotor. In this case also the number of permanent magnets is 40. The large number of rotor poles in relation to the number of stator slots makes it possible to obtain the torque needed for moving the elevator car from an elevator hoisting machine 2 fitting into a smaller space than prior art, e.g. into connection with a wall part 17 of the elevator hoistway.

As presented in FIG. 1, the suspension ratio of the elevator assembly is 2:1, in which case at least two rope pulleys 26 that move along with the elevator car are fixed into connection with the bottom part of the elevator car 15, and the rope pulleys are suspended with hoisting ropes 16 that pass via a rope pulley. The force effect exerted on the traction sheave of the hoisting machine is therefore only one-half of the weight of the elevator car. Here, 4 mm is selected as the diameter of the hoisting ropes, which enables the use of very small rope pulleys 26; the diameter of the rope pulleys is dependent on the diameter of the hoisting ropes, at a ratio of e.g. approx. 40.

In a preferred embodiment of the invention according to FIG. 1, the distance of the rear surface 21 of the guide rail 9 fixed to a wall part 17 of the elevator hoistway from the wall part 1 of the elevator hoistway is selected according to the following table for an elevator car having 2:1 suspension, taking into account the space required owing to the bending vibration of the hoisting machine 2:

| Distance of the rear surface of the guide rail from the wall part 1/mm | Nominal load of the elevator car L/kg | Load T of the elevator car acting on the traction sheave 5 |
| --- | --- | --- |
| 120 mm-170 mm | L ≤ 480 kg | T ≤ 240 kg |
| 128 mm-170 mm | 480 kg < L ≤ 680 kg | 240 kg < T ≤ 340 kg |
| 150 mm-195 mm | 680 kg < L < 1155 kg | 340 kg < T < 577 kg |

As can be observed from FIG. 1, reducing the distance between the guide rail 9 and the wall part 17 of the elevator hoistway enables increasing the width of the elevator car 15 in the direction of the axis of rotation 19 of the hoisting machine 2 of the elevator, in which case a more spacious elevator car 15 than before can be fitted into the same elevator hoistway. Increasing the volume of the elevator car 15 also increases the transport capacity of the elevator.

The fixing arrangement according to the invention for a hoisting machine is suited for use in different lifting systems; in addition to a passenger elevator and freight elevator system, the fixing arrangement can be used e.g. in mine elevators, drum drive elevators, and also in cranes.

In the preceding the invention is described in connection with an elevator assembly with counterweight; the invention is suited, however, also to elevator assemblies without counterweight.

In the embodiment of FIG. 1 described above the hoisting machine 2 is disposed such that the axis of rotation 19 of the hoisting machine 2 is situated essentially orthogonally with respect to the wall part 17; the direction of the axis of rotation of the hoisting machine can, however, also differ from an orthogonal direction, in which case the hoisting machine 2 can also be disposed e.g. such that the axis of rotation 19 is parallel with the aforementioned wall part 17. In this case the hoisting machine can be fixed such that only the hoisting ropes arriving at the rope grooves 14 of the traction sheave 5 or only the hoisting ropes leaving from the rope grooves 14 of the traction sheave 5 travel closer to the wall part 17 of the elevator hoistway than the rear part 21 of the guide rail of the elevator car.

In the embodiments described above hoisting ropes are used as the suspension means 16 of the elevator car; in place of hoisting ropes, also e.g. a belt or corresponding structure could be used as suspension means 16, in which belt or corresponding structure fibers, steel strands or corresponding that increase longitudinal tensile strength are fitted inside a matrix comprising an elastomer, such as rubber and/or polyurethane.

By means of the invention, the hoisting machine 2 can also be fixed e.g. to a horizontal/vertical support beam disposed in the elevator hoistway, instead of being fixed to a guide rail 9.

The invention is not only limited to be applied to the embodiments described above, but instead many variations are possible within the scope of the inventive concept defined by the claims.

The invention claimed is:

1. A fixing arrangement for a hoisting machine, the hoisting machine including a stationary structure and a rotating structure, the rotating structure including a traction sheave having a traction surface to exert a force effect, the fixing arrangement comprising:
   a fixing member extending laterally outward from a guide rail in at least two directions, the at least two directions being opposite to one another, and being in a width direction of the guide rail; wherein
      the hoisting machine is fixed to the fixing member at at least two fixing points to damp vibration caused by operation of the hoisting machine, the at least two fixing points being at opposite ends of the fixing member in the width direction of the guide rail, and the at least two fixing points being spaced apart from the guide rail by substantially the same distance in the width direction of the guide rail, the at least two fixing points are at substantially a same height, and a distance between the at least two fixing points is greater than, or equal to, a diameter of the traction sheave.

2. The fixing arrangement according to claim 1, wherein a damper is arranged at each of the at least two fixing points.

3. The fixing arrangement according to claim 2, wherein the hoisting machine is fixed to an integral piece between the at least two fixing points via the dampers, and wherein the integral piece is fixed rigidly to the fixing member.

4. The fixing arrangement according to claim 2, wherein the dampers are elastomer.

5. The fixing arrangement according to claim 1, wherein the fixing member is substantially continuous in a vertical direction from the at least two fixing points at at least one of a top part and a bottom part of the fixing member.

6. The fixing arrangement according to claim 1, wherein the hoisting machine is fixed to the fixing member by an integral piece between the at least two fixing points.

7. The fixing arrangement according to claim 1, wherein a bottom part of the hoisting machine is fixed to the fixing member at an additional fixing point.

8. The fixing arrangement according to claim 1, wherein the fixing member is part of the guide rail.

9. The fixing arrangement according to claim 1, wherein a ratio of the distance between the at least two fixing points of the hoisting machine to a diameter of a brake ring is greater than about 0.5.

10. The fixing arrangement according to claim 1, wherein the hoisting machine is at a top part of an elevator hoistway.

11. A fixing arrangement for a hoisting machine, the hoisting machine including a stationary structure and a rotating structure, the rotating structure including a traction sheave having a traction surface to exert a force effect, the fixing arrangement comprising:

a fixing member extending laterally outward from a guide rail in at least two directions, the at least two directions being opposite to one another, and being in a width direction of the guide rail; wherein the hoisting machine is fixed to the fixing member at at least two fixing points to damp vibration caused by operation of the hoisting machine, the at least two fixing points being at opposite ends of the fixing member in the width direction of the guide rail, and the at least two fixing points being spaced apart from the guide rail by substantially the same distance in the width direction of the guide rail, the at least two fixing points are at substantially a same height, a damper is arranged at each of the at least two fixing points, and the at least two fixing points are spaced apart from each other by at least a width of the fixing member, the width of the fixing member being in the width direction of the guide rail.

12. An elevator assembly comprising:
an elevator car suspended in an elevator hoistway;
a hoisting machine configured to move the elevator car along a guide rail fixed to a wall of the elevator hoistway, the hoisting machine including a stationary structure and a rotating structure, the stationary structure including a stator, and the rotating structure including a rotor and a traction sheave; wherein the stator, the rotor and the traction sheave are fitted concentrically on an axis of rotation of the hoisting machine;

the hoisting machine is fitted in connection with the guide rail via a support structure, the guide rail being fixed to the wall of the elevator hoistway apart from the wall surface, the rotating structure is supported by the stationary structure of the hoisting machine via one or more bearings, the stationary structure is further supported by the guide rail fixed to the wall of the elevator hoistway, the stator includes a concentrated fractional-slot winding, the slot number q of which is less than about 0.5, a distance of a rear surface of the guide rail from the wall of the elevator hoistway is: a) between about 120 millimeters and about 170 millimeters when the nominal load of the elevator car is less than or equal to about 480 kg; b) between about 128 millimeters and about 170 millimeters when the nominal load of the elevator car is between about 480 kg and about 680 kg; or c) between about 150 millimeters and about 195 millimeters when the nominal load of the elevator car is between about 680 kg and about 1155 kg, the hoisting machine is fixed to a support structure at at least two fixing points that are spaced apart in a width direction of the support structure, the at least two fixing points being at opposite ends of the support structure in a width direction of the guide rail, and the at least two fixing points being spaced apart from the guide rail by substantially the same distance in the width direction of the guide rail, the at least two fixing points are at substantially a same height, and a distance between the at least two fixing points is greater than, or equal to, a diameter of the traction sheave.

13. The elevator assembly according to claim 12, further comprising:

at least one rope pulley fixed in connection with the elevator car, the at least one rope pulley being configured to move along with the elevator car.

14. The elevator assembly according to claim 13, wherein the at least one rope pulley is suspended with a hoisting rope.

15. The elevator assembly according to claim 13, wherein a suspension ratio of the elevator assembly is about 2:1.

16. The elevator assembly according to claim 14, wherein the diameter of the hoisting rope is less than, or equal to, about 8 mm.

17. The elevator assembly according to claim 12, wherein the slot number q is about 0.3.

18. The elevator assembly according to claim 12, wherein the hoisting machine is in a space between the guide rail and the wall of the elevator hoistway.

19. The elevator assembly according to claim 12, wherein the hoisting machine is fixed to the support structure to dampen vibration caused by operation of the hoisting machine.

20. The elevator assembly according to claim 12, wherein an axis of rotation of the hoisting machine is substantially orthogonal with respect to the wall.

21. The elevator assembly according to claim 12, wherein the traction sheave, the rotor and the stator are arranged consecutively in a direction of an axis of rotation of the hoisting machine.

22. The elevator assembly according to claim 12, wherein a rim part of the traction sheave and the stator are arranged substantially face-to-face in a direction of an axis of rotation of the hoisting machine.

23. The elevator assembly according to claim 12, wherein the rotor is part of the rotating structure of the hoisting machine such that permanent magnets are fixed into a ring-shaped rim on a surface of the rotating structure.

24. The elevator assembly according to claim 12, wherein the hoisting machine is arranged in a top part of the elevator hoistway.

* * * * *